Patented Oct. 24, 1922.

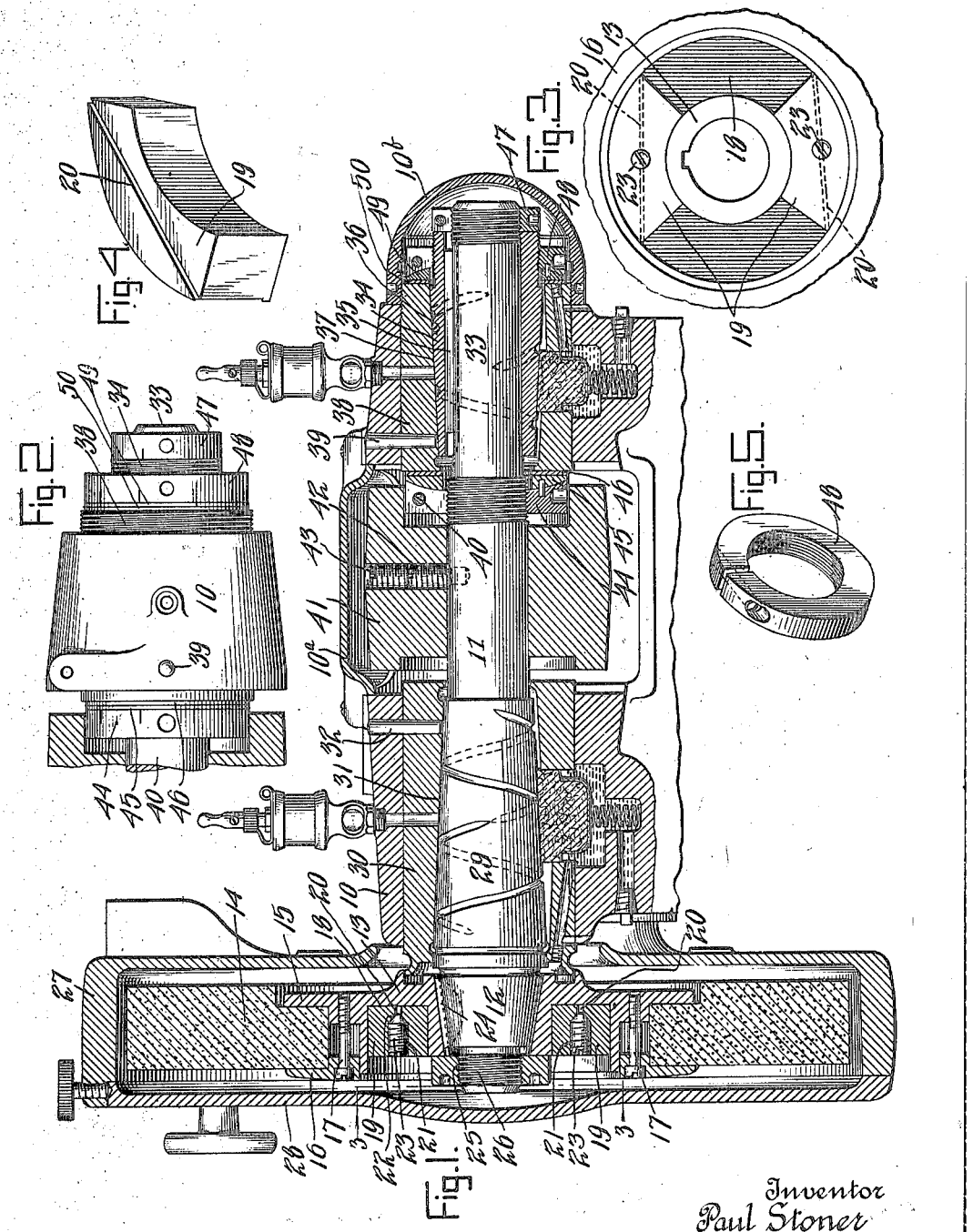

1,433,424

UNITED STATES PATENT OFFICE.

PAUL STONER, OF WAYNESBORO, PENNSYLVANIA, ASSIGNOR TO LANDIS TOOL COMPANY, OF WAYNESBORO, PENNSYLVANIA, A CORPORATION OF PENNSYLVANIA.

COMPENSATING BEARING FOR WHEEL SPINDLES.

Application filed November 18, 1920. Serial No. 424,906.

*To all whom it may concern:*

Be it known that I, PAUL STONER, a citizen of the United States, residing at Waynesboro, in the county of Franklin and State of Pennsylvania, have invented certain new and useful Improvements in Compensating Bearings for Wheel Spindles, of which the following is a specification.

My said invention relates to compensating bearings and more particularly to bearings for wheel spindles. In using high speed grinding wheels, it is necessary that the bearings for the wheel spindle be tight enough to keep the wheel in proper alignment and yet free enough to allow high speed without chattering or overheating.

One object of this invention is to provide means whereby any wear of the spindle or contacting bearing can easily be readjusted.

Another object is to provide a sleeve which will compensate automatically for the expansion of the spindle due to heating thereof.

Referring to the accompanying drawings which are made a part hereof and on which similar reference characters indicate similar parts, Figure 1 is a vertical longitudinal section through a wheel and spindle constructed in accordance with my invention;

Figure 2, a fragmentary plan of a portion thereof;

Figure 3, an elevation on the line 3—3 of Figure 1, showing the balancing weight;

Figure 4, a detail perspective of one of the weights; and

Figure 5, a detail perspective of one of the split ring adjusting vents.

In the drawings, the numeral 10 represents a casing having removable parts 10ª and 10ᵇ. A spindle 11 provided with tapered portions 12 and 29 is journaled in the casing. The hub portion 13 of a grinding wheel 14 is mounted on tapered portion 12 and is secured between a flange 15 of the hub and an annular collar 16. Screws 17 pass through the collar and enter the flange to hold the wheel firmly. Mounted in an annular recess 18 in the face of the hub portion 13 are a set of counterbalancing weights 19 slotted as at 20 (Figure 4) from one side only. The opposite side is provided with a threaded bore 21 communicating with the slot and terminating in a tapered portion 22, said bore 21 adapted to receive a screw 23 tapered at its end to conform to the portion 22 of the weight. It can be readily understood that by forcing the tapered portion of a screw against the tapered portion of its weight, I may expand the weight thereby firmly locking it into the recess 18 after moving the weights to a position where they will properly balance the wheel. The hub 13 is prevented from rotating on the spindle by means of a key 24 and securely locked thereon by means of the nut 25 threaded on the end portion 26 of the spindle. A casing 27 provided with a removable cover 28 houses all of the wheel structure.

Adjacent the tapered portion 12 of the spindle 11 is an oppositely tapered portion 29 forming the long bearing surface. A cylindrical bearing sleeve 30 provided with a tapered bore 31 surrounds this part of the shaft and is secured in the casing 10 by means of a pin 32. This pin engages the bearing sleeve 30 at its thickest portion which permits the sleeve to creep towards its thinner end when expanding from the heat caused by friction, thereby maintaining a uniform bearing relation to the spindle whether running hot or cold. It has been customary to hold sleeves, such as shown at 30, in place by pins engaging midway between their ends. In such prior constructions it is found that when the spindle is run at high speed both the spindle and bearing become heated and expand both transversely and longitudinally. The thicker part of the sleeve moving away from the smaller part of the spindle appears to increase the clearance at that point while the thicker part of the spindle binds against the thinner part of the sleeve. If the pin is placed at the thinner end of the sleeve it is found that the bearing runs hot, but if placed as shown at Figure 1 at the thick part of the sleeve the spindle may run at a very high speed without any deleterious effect, as apparently longitudinal expansion of the sleeve and the spindle compensate for each other and the relative position of the contacting surfaces remains unchanged.

Mounted for longitudinal adjustment on the opposite end 33 of the spindle 11 is a sleeve 34 keyed to the spindle to revolve therewith, by means of a key 35. The outer surface of this sleeve 34 is tapered as at 36 and forms the short bearing surface for the spindle. This surface contacts with the inner tapered bore 37 of a bearing sleeve 38 secured within the casing 10 by means of a pin 39 similar in design and performing the same function for the short bearing that the pin 32 performs for the long bearing.

The intermediate portion of the spindle 11 carries a belt pulley 41 secured thereto by means of a set screw 42 locked in place by another screw 43. This portion is also threaded at the rear of the pulley for the reception of a split nut 44 which is slightly hollowed out at one side to receive a self-aligning washer 45 which in turn carries a thrust washer 46 bearing against one end of the stationary bearing sleeve 38. The nut 44 is locked in place by a screw 40 located transversely of the slit in the nut to draw its ends together.

The extreme end of the spindle 11 is threaded to receive a lock nut 47 which bears against the outer end of the sleeve 34, which is in turn threaded to receive a nut 48 similar to nut 44 and provided with a hollowed portion on one side to receive a self-aligning washer 49 which in turn carries a thrust washer 50 bearing against the opposite end of the sleeve 38 from the washer 46.

As it is the purpose of the lock washers 44, 47, and 48 to adjust the bearing members lengthwise of the shaft, they are calibrated on their peripheries to insure the same relative degree of movement of the spindle and bearings.

The operation of adjusting the bearings is as follows:

The adjustments for wear in these bearings are made independently, and if only one bearing requires adjustment, this can be made without disturbing the other bearing. For taking up wear on the long bearing, the pulley guard 10ª and lock screw 43 are removed, the set-screw 42 is then backed off from the spindle, the pulley 41, being now free on the shaft, is moved over against the end of sleeve 30, which will permit access of a screw-driver and a spanner to the collar 44 and its screw 40. This collar is freed and rotated as many divisions of the calibrations as is necessary to make the adjustment required. The shield cap 10ᵇ is next removed and the collar 47 freed and turned to the right to the same extent as collar 44. These operations result in drawing the spindle 11 endwise, thus shifting the tapered portion in its bearing for taking up the wear without disturbing the adjustment of the sleeves 38 and 34.

The wear between sleeves 34 and 38 is taken up by means of the collars 47 and 48 in the following manner. Unscrew the collar 48 the proper number of divisions and then turn collar 47 to the right the same number of divisions which will shift the spindle sleeve 34 on the portion 33 of the spindle into the tapered portion 37 of the bearing.

My invention is not to be confined to the exact structure shown as it is understood that changes in the form, proportions, sizes and minor details may be resorted to without departing from the spirit, or sacrificing any of the advantages, of the invention.

Having thus fully described my said invention, what I claim as new and desire to secure by Letters Patent, is:

1. In combination a tapered spindle, a supporting casing therefor, a tapered bearing between the spindle and the casing, and pins engaging registering openings in the bearing and casing to anchor the bearing at one end while permitting it to creep at the other end, substantially as set forth.

2. In combination a tapered spindle, a casing therefor having a cylindrical opening, a sleeve fitting between the spindle and the casing, and pins engaging registering openings in the bearing and casing to anchor the sleeve at the thicker end while permitting it to creep at the thinner end, substantially as set forth.

3. In combination a spindle, a tapered journal rotatable therewith, a casing surrounding the journal, an internally tapered bearing sleeve between the casing and journal and a stationary pin engaging the sleeve at one end to anchor said end to the casing, substantially as set forth.

4. A device of the class described comprising a casing, a spindle within said casing having one bearing surface formed integral therewith and one bearing surface on a portion detachable therefrom, bearing sleeves surrounding said bearing surfaces and an anchoring pin at one end of each sleeve, the other end of the forward sleeve being free at all times to move along the spindle.

5. A device of the class described comprising a casing, a spindle within said casing, bearing sleeves for said spindle and a means in said casing adapted to anchor one end of each bearing sleeve and permit creeping of the other end thereof comprising pins engaging directly with the casing and the sleeve, substantially as set forth.

6. A device of the class described comprising a casing, a spindle within said casing having formed integral therewith a tapered bearing surface, a detachable tapered bearing surface secured thereto, cylindrical bearing sleeves having tapered bores to receive said tapered bearing surfaces and a pin passing through said casing and into the thick portion of each of the said bearing sleeves to permit of expansion thereof in one direction only, substantially as set forth.

7. In combination a casing, a spindle within said casing, a tapering journal member secured to the spindle near one end, the spindle having an oppositely tapered portion near the other end, internally tapered bearing sleeves separating the journal member and the tapered portion of the spindle from the casing and means at the thicker end of each bearing sleeve to permit longitudinal expansion toward the thinner end only, substantially as set forth.

8. In combination a casing, a spindle therein having a tapered portion, a journal member oppositely tapered and fixed to the spindle, bearing sleeves fitting between said tapering devices and the casing and pins engaging the thicker ends of said bearing sleeves to prevent creeping of said ends relative to the casing, substantially as set forth.

9. In a bearing, a fixed sleeve tapered interiorly, an oppositely tapered rotary journal, a spindle with which said journal rotates, means on the journal bearing against an end of the fixed sleeve adapted to draw the journal out of the sleeve and means on the spindle to limit such movement, substantially as set forth.

10. In a bearing, a fixed sleeve tapered interiorly, an oppositely tapered rotary journal, a spindle with which said journal rotates, and means to adjust to journal longitudinally of the sleeve comprising a nut threaded to the spindle and bearing against an end of the sleeve, and a nut threaded on the spindle and bearing against an end of the journal, substantially as set forth.

11. In combination a spindle having a tapered portion, a fixed bearing sleeve fitting closely thereabout and wear compensating means for the tapering engaging surfaces comprising a fixed internally tapered bearing sleeve surrounding another part of the spindle, a correspondingly tapered journal rotatable with the spindle, means cooperating with the journal to adjust the spindle longitudinally thereof, and means cooperating with the second fixed sleeve to limit such movement of the spindle, substantially as set forth.

12. In combination a spindle having a tapered portion, a fixed bearing sleeve fitting closely thereabout and wear compensating means therefor comprising a fixed internally tapered bearing sleeve surrounding another part of the journal, a correspondingly tapered journal rotatable with the spindle, means to hold the journal against movement into the sleeve, means to move the spindle through the sleeve, and means to limit the extent of such movement, substantially as set forth.

13. In combination, a spindle having oppositely tapering surfaces, one being formed on a journal separable from the spindle, fixed tapered bearing sleeves for said tapering surfaces, a nut on the spindle bearing against one end of a fixed sleeve, a nut also on the spindle bearing against an end of the journal, and a nut on the journal bearing against the opposite end of said fixed sleeve, substantially as set forth.

14. In combination, a spindle having oppositely tapering surfaces, one being formed on a journal separable from the spindle, fixed tapered bearing sleeves for said tapering surfaces, a nut on the spindle bearing against one end of a fixed sleeve, a nut also on the spindle bearing against an end of the journal, a nut on the journal bearing against the opposite end of said fixed sleeve, each of the nuts bearing against the fixed sleeve comprising a split threaded portion having a concave face, and a rocking member having a convex face to engage said concave face and a flat face to engage the sleeve, substantially as set forth.

In witness whereof, I have hereunto set my hand and seal at Washington, D. C., this thirteenth day of November, A. D. nineteen hundred and twenty.

PAUL STONER. [L. S.]

Witnesses:
E. W. BRADFORD,
F. W. DAHN.